M. VON ROHR.
MAGNIFYING SPECTACLE GLASS.
APPLICATION FILED AUG. 25, 1910.

1,000,346.

Patented Aug. 8, 1911.

Witnesses:
Paul Krüger
Richard Hahn

Inventor:
Moritz von Rohr

UNITED STATES PATENT OFFICE.

MORITZ von ROHR, OF JENA, GERMANY, ASSIGNOR TO THE FIRM OF CARL ZEISS, OF JENA, GERMANY.

MAGNIFYING SPECTACLE-GLASS.

1,000,346.  Specification of Letters Patent.  Patented Aug. 8, 1911.

Application filed August 25, 1910. Serial No. 578,862.

*To all whom it may concern:*

Be it known that I, MORITZ VON ROHR, a citizen of the German Empire, residing at Carl-Zeiss strasse, Jena, in the Grand Duchy of Saxe-Weimar, Germany, have invented a new and useful Magnifying Spectacle-Glass, of which the following is a specification.

Magnifying spectacle glasses, which are made up like a Galilean telescope of a collective lens and a dispersive lens fitted behind each other with an intervening space (air lens), have frequently been suggested for very short sighted eyes. The constructive forms of such glasses, indicated in such suggestions would, however, as their investigation by calculation has shown, have only a small useful field of vision (if in order to save weight single lenses were used), as the astigmatism along the oblique principal rays increases exceedingly rapidly toward the margin. From the researches which followed this investigation the present invention has resulted, in consequence of which, by giving the lenses a special form, a satisfactory astigmatic correction is attained.

The invention can be regarded as an improvement on such well-known spectacle glasses of the specified combination, the front surface of the collective lens of which has the stronger curvature, so that the collective effect is realized mainly by this front surface, and the air lens of which acts dispersively. The dispersive effect must then be assigned chiefly, for the purpose of the astigmatic correction, to the hinder surface of the dispersive lens, which surface must therefore be more strongly curved than the front surface. The adoption of this means of correction does not interfere with the removal of distortion and also permits of a considerable restriction of the chromatic aberration, which ordinarily has a prejudicial effect in the case of strong spectacles, at least at the margin of the field of vision. In addition to this, such combinations of lenses after the type of the Galilean telescope exhibit the well-known advantageous property, to give magnified images on the retina. When the short sighted eye is astigmatic as well, one of the lens surfaces may be made cylindrical or toric.

Figure 1:
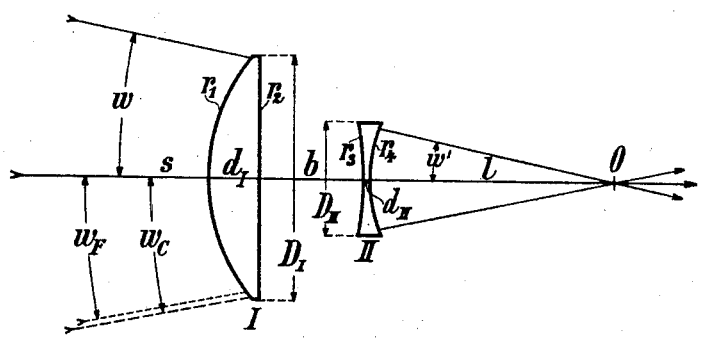
Figure 2:
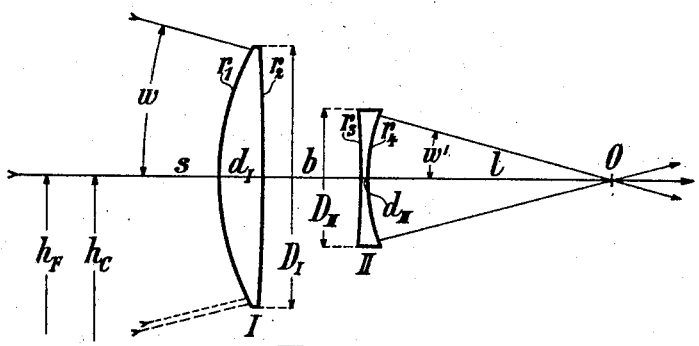

In the annexed drawing: Figure 1 is a diagrammatic view of a spectacle glass constructed according to the invention, by which an exceedingly short sighted eye is made capable of seeing distant objects sharply. Fig. 2 is a diagrammatic view of the reading glass to be prescribed for the same eye.

For both glasses not only is the astigmatism along the principal rays, which pass through the margin, as good as eliminated, but also the chromatic aberration of the same principal rays is much less than with the simple dispersive spectacle glasses of high power, and further only a small amount of distortion remains.

*First example*, Fig. 1.—This is a spectacle glass built up of two separate lenses I and II for an eye of —18 dptr. (dioptries) and a very great distance $s$ of the object from the front vertex of the lens I. The section $b$ of the axis between the two lenses is 10.5 mm. long, the section $l$ from the lens II to the point of intersection O of the principal rays (point of rotation of the eye) is 25 mm. The angle of inclination $w$ of the principal rays on the object side amounts for the margin of the glass to 10.960°, the corresponding angle $w'$ on the eye side to 12.0°. The magnification of the image on the retina in the direction of the axis is 1.7. The distortion corresponding to the said principal rays is so far eliminated, that the distance of the marginal image points from the axis deviates only by 0.3 per cent. from that one, which would correspond to the magnification existing in the axis. The following table contains, besides the dimensions of the lenses and the kinds of glass, also particulars relative to what remains of astigmatism and chromatic aberration. The astigmatism is represented by the intersectional distances $s'_s$ and $s'_t$ (measured on the eye side from the place of emergence on the hindermost lens surface to the point O) of the sagittal and meridional pencils, which belong to the principal ray coinciding with the axis, to one of mean inclination and to the marginal principal ray. The chromatic aberration is characterized by the angles of inclination $w_C$ and $w_F$ of the red and the blue components, which correspond on the object side to the marginal principal ray having on the eye side the angle of inclination $w'$.

*Dimensions of the Lenses in mm.*

Lens I: $d_I = 5.2$  $D_I = 25.0$  $r_1 = 19.60$  $r_2 = 8$
Lens II: $d_{II} = 0.5$  $D_{II} = 11.5$  $r_3 = 33.01$  $r_4 = 15.10$

*Kinds of Glass.*

Lens I: $n_D = 1.5164$  $v = 64.1$
Lens II: $n_D = 1.6211$  $v = 36.2$

*Correction of the Astigmatism.*

$w = 0$  $7.751°$  $10.960°$
$s'_s = 55.03$ mm.  $54.07$ mm.  $53.48$ mm.
$s'_t = 55.03$ "  $52.80$ "  $54.13$ "

*Correction of the Chromatic Aberration.*

$w' = 12.0°$  $w_C = 10.973°$  $w_F = 10.947°$

*Second example*, Fig. 2.—The defect of the eye again amounts to —18 dptr., but the distance $s$ of the object, which is plane and perpendicular to the axis of the spectacle glass, is only 300 mm. The distance $b$ is 10.0 and the distance $l$ again 25 mm. The greatest angle of inclination $w$ of the principal rays on the object side is 14.393°, the one $w'$ on the eye side is 15.0°. The magnification of the image on the retina in the direction of the axis is 1.7. The distortion at the margin of the image field amounts to 0.6 per cent. The chromatic aberration is defined below, instead of as in the former example by the angles $w_C$ and $w_F$, by the distances $h_C$ and $h_F$, in which the red and the blue components pierce the object plane.

*Dimensions of the Lenses in mm.*

Lens I: $d_I = 4.5$  $D_I = 26.6$  $r_1 = 27.72$  $r_2 = 479.8$
Lens II: $d_{II} = 0.5$  $D_{II} = 14.0$  $r_3 = 80.98$  $r_4 = 19.47$

*Kinds of Glass.*

Lens I: $n_D = 1.5183$  $v = 60.5$
Lens II: $n_D = 1.6211$  $v = 36.2$

*Correction of the Astigmatism.*

$w = 0$  $10.196°$  $14.393°$
$s'_s = 55.60$ mm.  $55.65$ mm.  $55.82$ mm.
$s'_t = 55.60$ "  $55.24$ "  $55.72$ "

*Correction of the Chromatic Aberration.*

$w' = 15.0°$  $h_C = 91.06$ mm.  $h_F = 91.34$ mm.

I claim:

A magnifying spectacle glass for myopes, consisting of a chromatically non-corrected collective front lens having its front surface more strongly curved than the hinder surface, and a chromatically non-corrected dispersive hinder lens, which two lenses are separated by a dispersive air lens, the hinder surface of the hinder lens having a curvature which amounts at least to 1.5 times the curvature of the front surface of this lens.

MORITZ von ROHR.

Witnesses:
PAUL KRÜGER,
ALFRED MACKEDENY.